United States Patent [19]

Schimion et al.

[11] 4,394,264
[45] Jul. 19, 1983

[54] MAGNETIC LIQUID FILTER

[75] Inventors: Werner Schimion, Hilchenbach; Josef Herbrand, Brühl, both of Fed. Rep. of Germany

[73] Assignee: SMS Schloemann-Siemag Aktiengesellschaft, Düsseldorf, Fed. Rep. of Germany

[21] Appl. No.: 302,759

[22] Filed: Sep. 16, 1981

[30] Foreign Application Priority Data

Sep. 17, 1980 [DE] Fed. Rep. of Germany ....... 3035003

[51] Int. Cl.³ .................. B01D 35/06; B03C 1/06; C02F 1/48
[52] U.S. Cl. .................. 210/222; 209/229; 209/232
[58] Field of Search .............. 210/222, 223, 86; 134/9; 15/256.5; 209/217, 219, 229, 230, 232

[56] References Cited

U.S. PATENT DOCUMENTS

| 3,143,496 | 8/1964 | Maretzo | 210/222 |
|---|---|---|---|
| 3,286,841 | 9/1966 | Dinglinger | 210/223 |
| 3,980,562 | 9/1976 | Nilsson | 210/222 |
| 4,142,479 | 3/1979 | Yano | 210/222 |
| 4,153,542 | 5/1979 | Bender | 210/222 |
| 4,261,826 | 4/1981 | Dorgathen | 210/222 |
| 4,264,442 | 4/1981 | Jackson | 210/86 |
| 4,276,161 | 6/1981 | Matsui | 210/86 |

FOREIGN PATENT DOCUMENTS 2743055  3/1979  Fed. Rep. of Germany .

Primary Examiner—Charles N. Hart
Assistant Examiner—Wanda L. Millard
Attorney, Agent, or Firm—Karl F. Ross; Herbert Dubno

[57] ABSTRACT

A machine for filtering particles, in particular magnetically attractable particles, from a liquid comprises a housing having a vessel, a weir in the vessel subdividing same into an elongated treatment compartment having a predetermined compartment length and an outlet compartment, this housing being formed in the treatment compartment with a sump, and an inlet for introducing a liquid to be cleaned into the treatment compartment and an outlet for withdrawing liquid from the outlet compartment. In addition the apparatus has a carriage displaceable longitudinally on the vessel above the treatment compartment and suspending a vertical carriage frame in the treatment compartment, an array of horizontally extending spaced magnetic bars carried on the carriage frame in the treatment compartment, with the bars each having a bar length measured parallel to this treatment compartment that is substantially less than the compartment length. Respective scrapers are fixed on the housing above the sump and engaging the bars. This carriage with these bars can be displaced longitudinally relative to the housing and scrapers through a distance equal generally to the bar length and thereby scraping particles off the bars, whereby the particles scraped off the bars drop in the treatment compartment.

26 Claims, 10 Drawing Figures

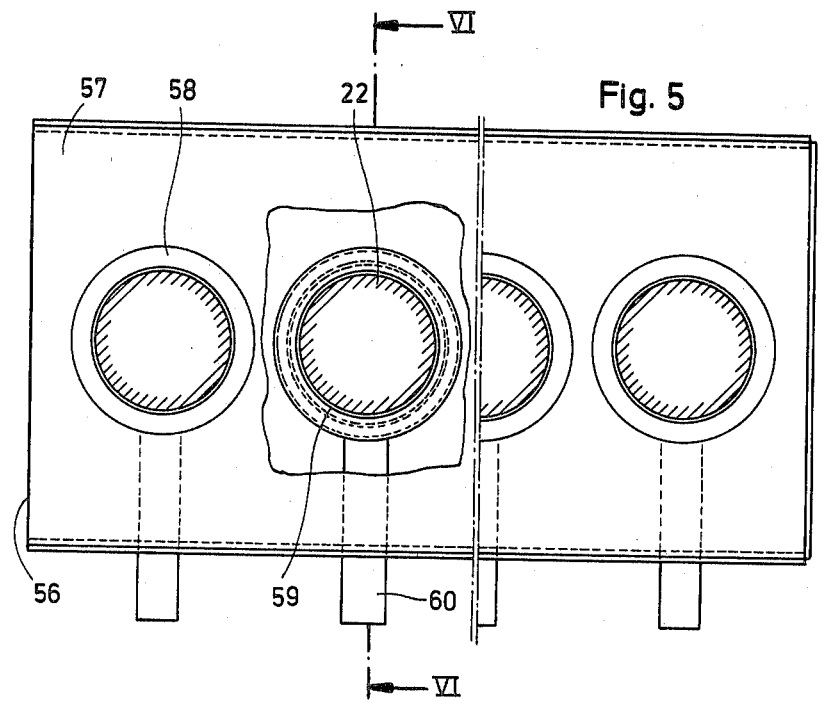
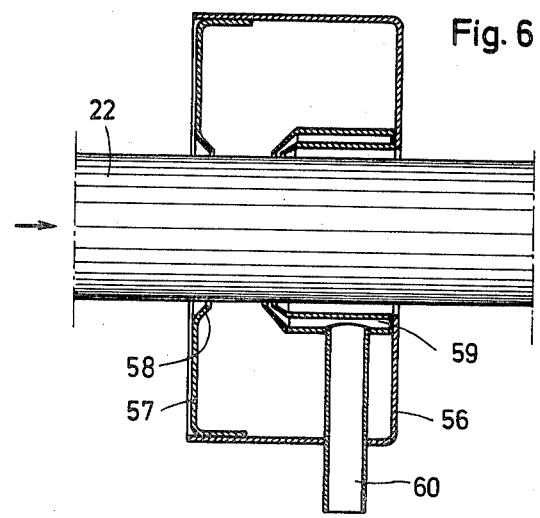

MAGNETIC LIQUID FILTER

FIELD OF THE INVENTION

The present invention relates to a magnetic liquid filter. More particularly this invention concerns a machine for filtering magnetically attractable particles out of a liquid, as for example a liquid used for lubrication or cooling of a machining operation.

BACKGROUND OF THE INVENTION

It is standard practice in a machining operation, as for example disclosed in German Pat. No. 2,743,055, to filter magnetically attractable particles out of a liquid used for lubrication or cooling of a machining operation by passing the liquid through a treatment compartment in a vessel provided in this compartment with an array of spaced-apart magnetic bars, normally permanent magnets. As the liquid passes through the array between the bars the magnetically attractable particles—normally iron and steel fragments—stick to the magnets.

When these magnets become loaded with such particles it is standard practice to lift the array out of the vessel and scrape the adhering particles from the bars. Thus a free space above the machine must be provided which is large enough to accommodate the lifted-out bars. The scrapers also must be replaced frequently, as they are subjected to heavy abrasion by the normally very hard particles they are stripping off the bars. Thus such machines have substantial disadvantages.

OBJECTS OF THE INVENTION

It is therefore an object of the present invention to provide an improved magnetic filter.

Another object is the provision of such a magnetic filter which overcomes the above-given disadvantages.

A further object is to provide a magnetic filter which is substantially smaller and which can be operated and serviced in a substantially smaller space than the prior-art such filters.

SUMMARY OF THE INVENTION

These objects are attained according to the instant invention in a machine for filtering particles, in particular magnetically attractable particles, from a liquid which comprises a housing having a vessel, a weir in the vessel subdividing same into an elongated treatment compartment having a predetermined compartment length and an outlet compartment, this housing being formed in the treatment compartment with a sump, and means for introducing a liquid to be cleaned into the treatment compartment and for withdrawing liquid from the outlet compartment. In addition the apparatus has a carriage displaceable longitudinally on the vessel above the treatment compartment and suspending a vertical carriage frame in the treatment compartment, an array of horizontally extending spaced magnetic bars carried on the carriage frame in the treatment compartment, with the bars each having a bar length measured parallel to this treatment compartment that is substantially less than the compartment length. Respective scrapers are fixed on the housing above the sump and engaging the bars. Means is provided for displacing this carriage with the bars longitudinally relative to the housing and scrapers through a distance equal generally to the bar length and thereby scraping particles off the bars, whereby the particles scraped off the bars drop in the treatment compartment. Finally means is provided in the apparatus according to the invention for withdrawing liquid from the sump. According to the invention the bars are substantially cylindrical and the scrapers engage circumferentially around them.

Thus the machine according to the instant invention takes up relatively little space, in fact much less than any of the prior-art such machines. In addition it can be serviced in a relatively limited area as the magnetic bars do not have to be pulled out of the treatment compartment to be cleaned. As a result such a machine can be integrated in operations relatively easily.

According to another feature of this invention the treatment compartment is formed at one end with an inlet. The machine further comprises deflecting plates carried on the frame between the bars and the inlet. These deflecting plates direct the water that is normally introduced at the bottom of the end of the treatment compartment remote from the weir upward through the array of bars. Thus the liquid will intimately contact the bars and be thoroughly stripped of any magnetically attractable particles.

In accordance with yet another feature of the invention the means for displacing the carriage includes an electric motor on the carriage. Furthermore this means includes at least one horizontal rack on the housing above the treatment compartment and at least one pinion meshing with this rack, rotatable on the carriage, and driven by the motor. Thus the carriage can power itself back and forth along the housing.

The frame according to this invention includes horizontally spaced end members each having a plurality of vertically and horizontally spaced holes receiving respective ends of the respective magnetic bars. More particularly, each of these vertical elements defines a vertical row of respective such holes. The ends of the bars according to the invention are each formed with a radially outwardly open groove. Each of the end members is provided with a slidable element engageable in the respective grooves. This element is normally vertically slidable in the respective frame member and normally each of the members has two such elements.

The housing according to the present invention has a scraper frame separate from the carriage frame and having respective scraper holders removably carrying the scrapers. This scraper frame has vertical frame elements and horizontal frame elements bridging the vertical elements.

The scrapers according to the invention can be synthetic-resin cuffs circumferentially received in the respective holders and gripping the respective magnetic bars. Such an arrangement has the advantage of extreme simplicity. Normally such scrapers are relatively inexpensive items that can be replaced easily.

It is also possible within the scope of the present invention for the scrapers to include nozzles directed at the respective bars and means for feeding a fluid such as air under pressure to the nozzles. These nozzles are annular, spacedly surround the magnetic bars, and are directed to an acute angle at the respective bars.

More particularly according to this invention, each of the vertical frame elements can be generally tubular and open downward into the sump. With such a system particles blown off the bars will fall down into the sump where they can be pumped out.

It is also possible, according to yet another feature of the invention, for the vertical frame elements to be formed internally with the nozzles and to be formed with throughgoing passages through which the respective bars extend. More particularly these vertical frame elements are generally hollow and have front and rear walls formed with aligned holes through which the respective bars pass. The nozzles are provided between these holes, and the walls are formed with annular inward extensions at the holes. One of these walls can be mounted to move horizontally relative to the respective nozzle.

According to further features of the invention, the sump is a transverse gully formed in the floor of the vessel and has an incline transverse to the treatment compartment. The machine further comprises a drain conduit connected to the lowest portion of the sump, valve means in this conduit, and a pump in the conduit between its valve and the sump. This valve means may be constituted, according to another feature of the invention, as a pair of valves one of which is connected to a conduit that opens into the outlet compartment and the other of which opens externally of the vessel. Thus the treatment compartment may be drained into the outlet compartment via the one conduit before a scraping operation, and the particle slurry created by the scraping may be drained outside via the other conduit. This one conduit is provided with another valve preventing flow in itself. This valve may be a check valve preventing back flow into the sump, or a standard manually operated valve.

It is also possible for the apparatus of this invention to have means including nozzles on the scraper frame for spraying a liquid on the scrapers as same are displaced along the magnetic bars. This allows magnetic particles scraped off the bars to be washed down into the sump. The pump is provided, for automatic control of the bar-cleaning operation, with means for detecting the level of liquid in the sump and for turning off the pump when it is generally empty.

DESCRIPTION OF THE DRAWING

The above and other features and advantages will become more readily apparent from the following, reference being made to the accompanying drawing in which:

FIG. 5 is a partly sectional end view of the apparatus according to this invention.

FIG. 6 is a section taken along line VI—VI of FIG. 5;

SPECIFIC DESCRIPTION

Figure 1:
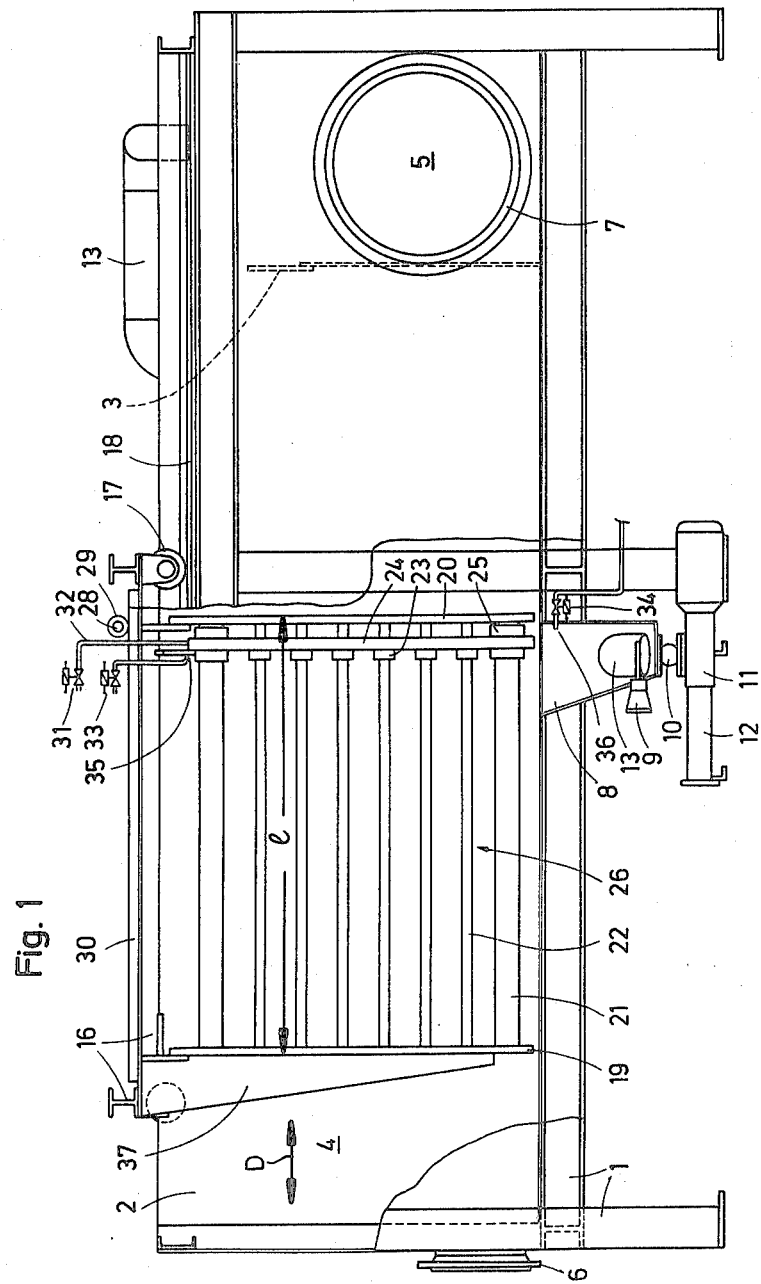
FIG. 1 is a side view, partly in longitudinal section of the apparatus according to this invention.
Figure 2:
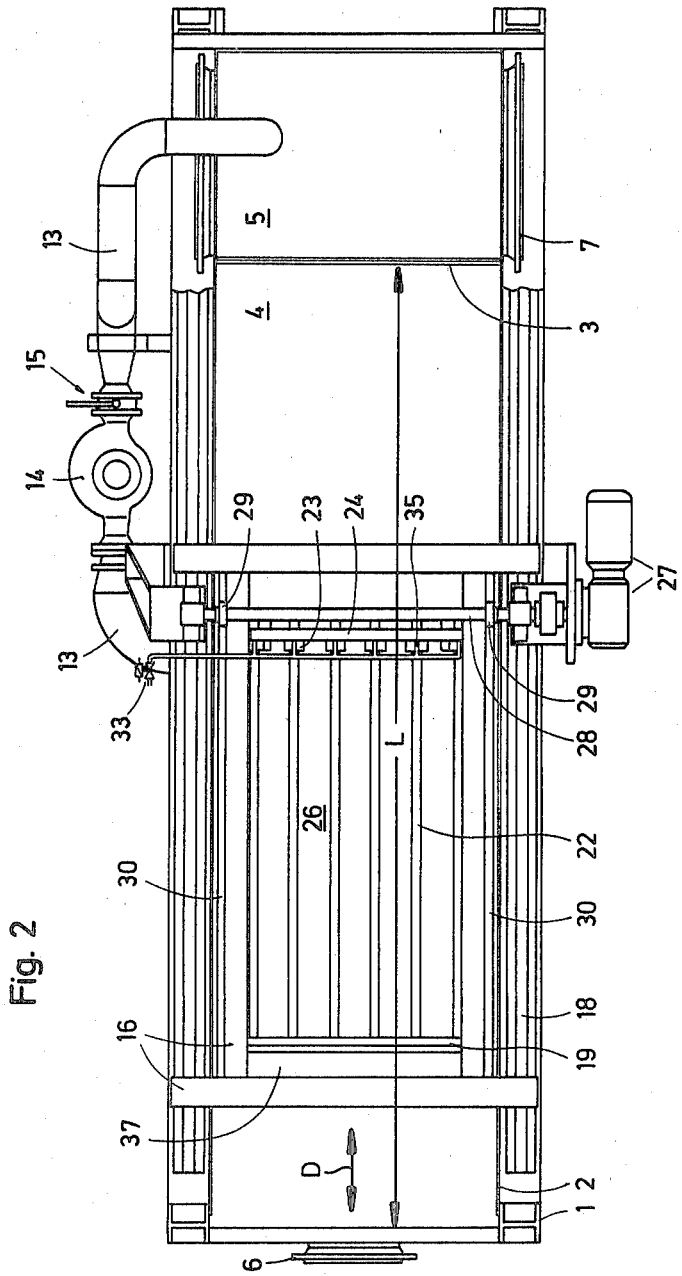
FIG. 2 is a top view of the apparatus of FIG. 1.
Figure 3:
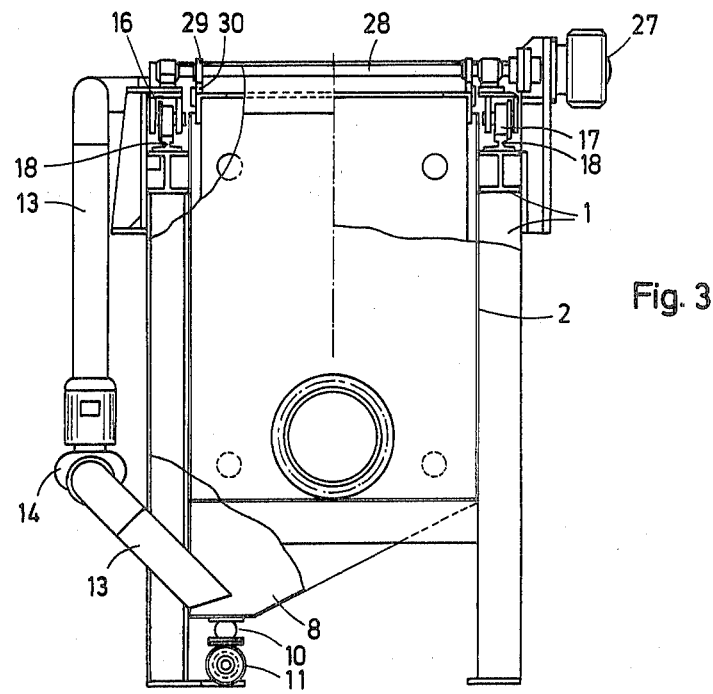
FIG. 3 is a partly sectional end view of the apparatus of FIG. 1.

The apparatus according to this invention has as shown in FIGS. 1–3 a frame or housing 1 supporting an elongated upwardly open vessel 2 subdivided by a vertically adjustable weir 3 into an upstream treatment compartment that is elongated parallel to the longitudinal direction D of the vessel 2 and into a downstream outlet compartment 5. The treatment compartment 4 is provided at the lower edge of its upstream end remote from the weir 3 with a dirty-liquid input fitting 6 and at the sides of the outlet compartment 5 with outlet fittings 7. Liquid to be stripped of magnetically attractable particles is fed into the vessel through the inlet 6, fills the upstream compartment 4 to the level of the upper edge of the weir 3, and then flows over into the outlet compartment 5. Thus the flow in the compartment 4 is longitudinal and rising in the downstream direction.

The treatment compartment 4 is provided generally centrally with a sump or gulley 8 whose floor as shown in FIG. 3 is inclined steeply to one side where a drain valve 10 is provided. An electrically powered slurry pump 11 is connected through this valve 10 to the sump 8 and is provided with a downstream drain pipe 12 (FIG. 1). Thus when this valve 10 is open and the pump 11 operates any liquid in the sump 8 will be forced out via the drain conduit 12.

In addition a conduit 13 has a lower upstream end opening in the sump 8 slightly above the valve 10 and an upper downstream end opening into the top of the outlet compartment 5. This conduit 13 is in turn provided with its own pump 14 and with a valve 15. The downstream end of the conduit 13 opens as shown in FIG. 1 above the upper edge of the weir 3 so that it will always be above the liquid level in the vessel 2. If it opened lower it would be provided with a check valve to prevent flow back to the sump 8 from the compartment 5. This pump 14 can therefore completely drain the compartment 4 into the compartment 5. A level detector 9 is provided in the sump 8 and can operate either of the pumps 11 or 14. This level detector 9 generates an output signal when the liquid level in the sump 8 is below it, indicating that the compartment 4 is virtually empty.

The two valves 10 and 15 and two pumps 11 and 14 can be replaced according to this invention by a single pump and a three-port two-position valve. In such an arrangement the single intake port of this valve is connected via the single pump to the lowest portion of the sump 8, and the one outlet port is connected back to the outlet compartment 5 and the other to the drain. Thus in one position liquid pumped out of the sump will be fed to the outlet compartment, and in the other it will be fed via the drain to a waste receptable or particle-recovery device.

A carriage 16 is provided with wheels 17 by means of which it can roll back and forth in the direction D. This carriage 16 has an overall length 1 which is equal to about half of the overall length L, measured in the direction D, of the compartment 4. The carriage 16 is formed of profile-steel frames or end members 19 and 20 which extend down into the compartment 4 and which are interconnected into a rigid carriage frame by horizontal members 21 that extend parallel to the direction D. Permanent-magnet bars 22 of cylindrical shape have their ends seated in these end members 19 and 20. Normally these bars are formed of cylindrical tubes of a nonmagnetic material such as brass, nonmagnetic stainless steel, or the like, which contain cylinder- or tube-shaped permanent magnets. These magnets 22 therefore form a three-dimensional array 26 that substantially fills the middle region of the treatment compartment 4 so that any liquid passing from the left-hand upstream end to the right-hand downstream end will intimately contact the magnets 22.

Deflector plates 37 carried on the carriage 16 deflect horizontally flowing water upwardly through the array 26 to maximize such contact. It is also possible according to the instant invention to provide deflector plates which subdivide the main flow of liquid in the treatment chamber 4 into several streams. Such deflector plates would be constituted as plates extending transverse to the direction D and provided between alternate adjacent rows of magnets 22, with the plates staggered in the direction D to force the streams to meander through the array 26.

Each of the magnetic bars 22 is surrounded by a respective annular scraper 23 which may be of the synthetic-resin sleeve type shown in FIGS. 1-3 which snugly circumferentially snugly surround the respective magnets 22. These scrapers 23 are themselves carried in an upright scraper frame 24 that is guided by bushings 25 on the horizontal members 21 of the carriage frame 19, 20. The frame 24 is upright and hollow and is connected to a compressed-air valve 31 that can direct a stream of compressed air down in the frame 24 to loosen and transport away particles stripped by the scrapers 23 from the magnets 22.

The carriage 16 carries a reversible electric drive motor 27 which has a horizontal output shaft 28 extending perpendicular to the direction D and carrying two pinions 29 that mesh with respective racks 30 extending in the direction D and fixed on the housing 1 adjacent the rails 18. Thus this motor 27 can move the magnet array 26 back and forth in the direction D along the housing 1, thereby longitudinally moving the magnets 22 through the scrapers 23 which normally rest at the downstream ends of the magnets 22 as shown in FIG. 2.

In addition the frame 24 for the scrapers 23 is provided with nozzles 35 and 36 that can be fed another fluid, here a liquid under pressure from respective valves 33 and 34. The liquid can be an emulsion or, when the system is used in a sintering process, water. The addition of such a liquid to the particles stripped by the scrapers 23 from the magnets 22 makes them flow down into the sump 8 as a slurry that can readily be pumped off by the pump 11 when the valve 10 is open.

The apparatus described above functions as follows:

Liquid carrying magnetically attractable particles, normally iron and steel chips and shavings, is fed to the inlet 6 so as to fill the compartment 4 to the upper edge of the weir 3. Thereafter the liquid will flow downstream—to the right in the drawing—and simultaneously upward through the array 26 which substantially fills the central region of the treatment compartment 4. As the liquid passes between the magnetic bars 22 the magnetically attractable particles in it will stick to these magnets 22.

When the magnets 22 have become loaded with so many magnetic particles and become so thick that they impede flow of liquid through the device, the feed to the input 6 is stopped. Then the valve 15 is opened and pump 14 started to drain the compartment 4 into the compartment 5. Once the detector 9 senses that the compartment 4 is empty, the pump 14 is stopped and valve 15 is closed. The motor 27 is then energized and the valves 31, 33, and 34 are opened to feed air into the frame 24 and spray annular streams of air and liquid over the scrapers 23 as the array 26 moves first from left to right as seen in FIGS. 1 and 2. At the end position, with the end member 20 virtually against the weir 3, an end switch reverses the motor 27 and sends the array back to the illustrated starting position, where another end switch stops the motor 27. Meanwhile the valve 10 is open and the pump 11 operates to drain the particle-/liquid slurry out of the sump 8 and feed it to the drain line 12.

When the machine finally returns to the illustrated end position of FIGS. 1 and 2 another end switch stops the motor 27 and normally also closes the valves 10, 31, 33, and 34 and shuts down the pump 11. Particle-containing liquid can again be fed to the input 6 to fill the compartment 4 and the cycle can be repeated again once the bars 22 become overladen with particles.

The above-described sequence of events can be controlled by limit switches and float switches from a central controller which may incorporate various time delays. Such a time delay would keep the pump 11 or 14 running for some time after the detector 9 has sensed that the sump 8 is empty, in order to drain out the last liquid that takes some time to stream down over the various parts of the apparatus. A time delay could keep the nozzles 35 and 36 spraying and the pump 11 operating for a while after the motor 27 has stopped to cleanse any residual particles off the scrapers 23.

Figure 4:
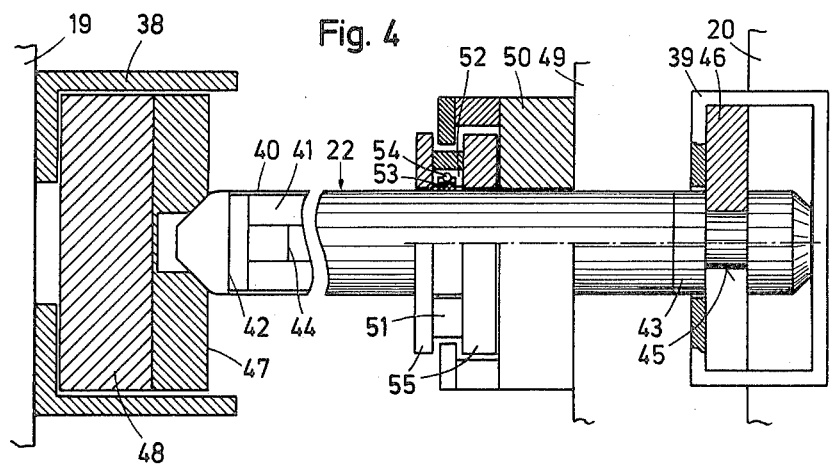
FIG. 4 is a large-scale longitudinal section through a detail of the apparatus of FIG. 1.

When the particles to be filtered out are particularly hard and abrasive, as in certain grinding operations, the scrapers 23 wear out very rapidly and require periodic replacement. Accordingly recourse is had to a system such as shown in FIG. 4. Here the end members 19 and 20 carry support bars 38 and 39, the former being of C-section and the latter of closed rectangular section. The magnetic bars 22 are formed of an outer stainless-steel tube 40 containing tubular permanent magnets 41 into whose ends are fitted cores 44 carrying end pieces 42 and 43. The end piece 42 is formed as a blunt point and the end piece 43 is formed with a circumferential and outwardly open groove 45. A holding bar 46 that is vertically slidable in the bar 39 can engage in the grooves 43 of a row of superposed magnets 22 to lock them in place. The other ends of these magnets 22 are received in respective recesses of a bar 47 carried in the U-section element 38 and pushed into good contact by a removable holding element 48.

Similarly here a scraper frame 49 carries a holed C-section scraper bar 50 which engages in a groove of a vertical bar 51 formed with cutouts 52 for respective scraper rings 53 which are surrounded by spiral springs 54 that press them tightly against the outer tube 40. The cutouts 52 are closed at each end by holed upright bars 55 between which the lips of the C-section bar 50 engage.

In order to change the scrapers 53 the carriage 16 is moved a little to the right, so as to provide some clearance between the elements 49 and the elements 39. The holding elements 38 are then withdrawn vertically, so that the bar 47 can be moved away from the end 42 and also withdrawn vertically. The entire carriage 16 is then moved to the extreme right so that the holding elements 50 move into the C-section element 38, off the end of the magnets 22.

Thereafter the elements 51 are pulled up and out of the element 50 and a new such element 51 provided with new scrapers 53 is inserted in its place. The above-enumerated steps are then repeated in reverse to reassamble the arrangement.

It is possible when changing scrapers 53 to also change magnets 22. This is done by pulling out the holding elements 46 and withdrawing the magnets 22 axially, to the left in FIG. 4, through the holes in the C-section element 38 with the carriage 16 in the extreme downstream or right-hand position.

When such abrasive particles are being fitered out that it is advisable to avoid all direct physical contact between the scrapers and the particles, a system such as that shown in FIG. 5 and 6 is employed. Here a scraper holder or support element 56 is formed as a vertically extending rectangle having a front wall 57 formed with bent-in extensions or collars 58 spacedly surrounding the magnets 22. This element is provided internally with an annular nozzle 59 directed at an acute angle toward the front wall 57 around the magnets 22. Air under pressure is fed via conduits 60 to these nozzles 59 so that particles adhering to the magnets 22 are blown off them, dropping down in the hollow element 56 to the sump 8 underneath. The inner edges of the bent-in collars 58 are spaced outwardly from the magnets 22 enough to allow the largest particles likely to be encountered to pass. The spacing of the nozzles 59 from the surfaces of the respective magnets is substantially less.

Figure 7:
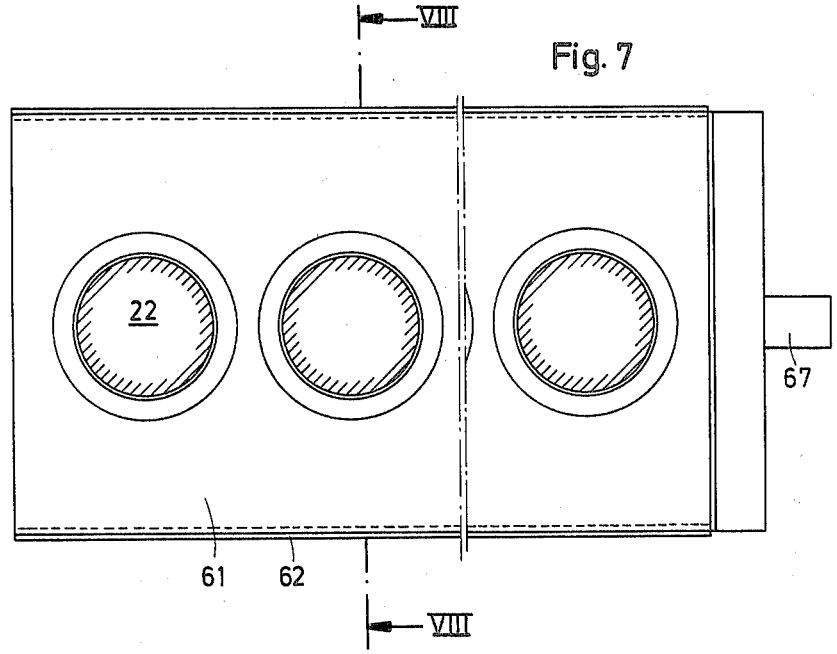
FIG. 7 is a view similar to FIG. 5 showing a detail of another arrangement according to this invention.
Figure 8:
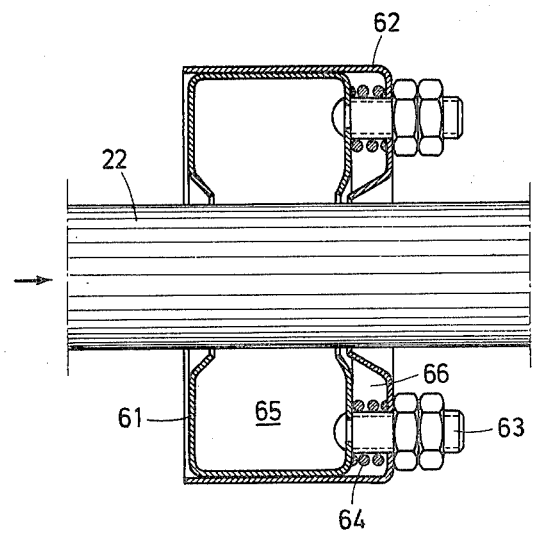
FIG. 8 is a section taken along line VIII—VIII of FIG. 7.
Figure 9:
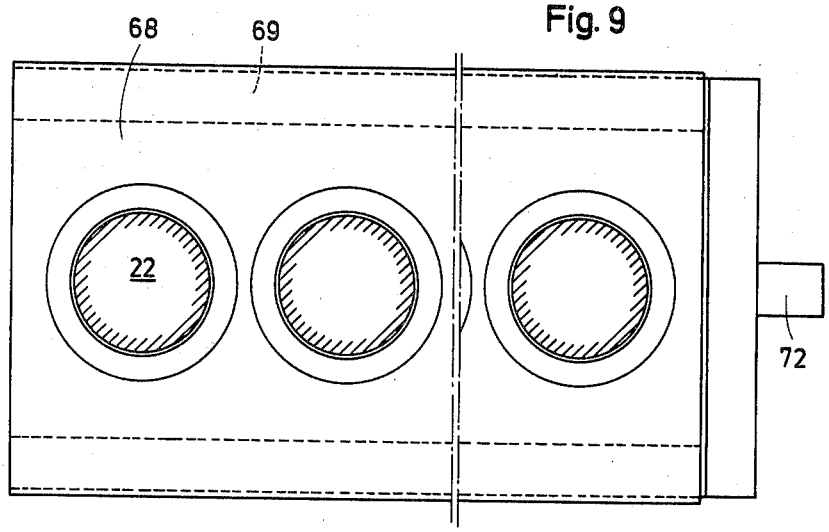
FIG. 9 is a view similar to FIG. 5 but showing a detail of yet another arrangement according to the instant invention.

It is also possible as shown in FIGS. 7 and 8 to employ a scraper element 61 of generally closed rectangular section and formed with bent-in collars around holes through which the magnetic bars 22 pass. An end plate 62 at one side of the element 61 can move longitudinally relative to this element 61, supported by springs 64 at a maximum spacing from it determined by bolts 63. A chamber 66 between the elements 61 and 61 is supplied with air under pressure from an input fitting 67, and the chamber 65 is used to collect particles blown off the magnets 22 and conduct them down to the sump 8.

Figure 10:
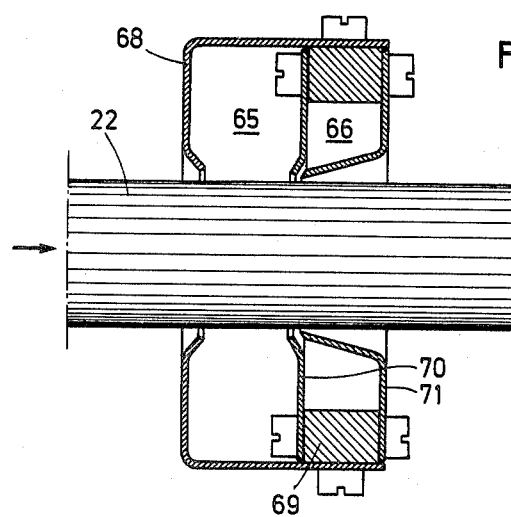
FIG. 10 is a section taken along line X—X of FIG. 9.

A similar system is shown in FIG. 10, but here the element 68 is of C-section and is provided with a pair of plates 70 and 71 separated by a spacer 69 to determine the nozzle size. An input fitting 72 feeds compressed air to the compartment 66 to blow particles off the magnets 22. In such an arrangement the radial spacing between the nozzle formed by the plates 70 and 71 is substantially less than that formed by any other part of the scraper assembly.

It has been found that such an arrangement is very effective in cleaning the magnets 22, and has an extremely long service life. It takes up substantially less space than any of the prior-art systems, as the magnets 22 are cleaned right in the treatment compartment 4, that is there is no need to provide space adjacent the machine for the magnets during the cleaning operation.

We claim:

1. A machine for filtering particles, in particular magnetically attractable particles, from a liquid, said machine comprising:
   a housing having a vessel;
   a weir in said vessel subdividing same into a horizontally elongated treatment compartment having a predetermined horizontal compartment length and an outlet compartment, said housing being formed in said treatment compartment with a sump;
   means for introducing a liquid to be cleaned into said treatment compartment and for withdrawing liquid from said outlet compartment;
   a carriage displaceable horizontally and longitudinally on said vessel above said treatment compartment and suspending a vertical carriage frame in said treatment compartment;
   an array of horizontally extending spaced magnetic bars carried on said carriage frame in said treatment compartment, said bars each having a bar length measured parallel to said treatment compartment that is equal at most to about half said compartment length;
   respective scrapers fixed on said housing above said sump and engaging said bars;
   means for displacing said carriage with said bars horizontally and longitudinally relative to said housing and scrapers through a distance equal generally to said bar length and thereby scraping particles off said bars, whereby the particles scraped off said bars drop in said treatment compartment into said sump; and
   means for withdrawing liquid from said pump.

2. The machine defined in claim 1 wherein said bars are substantially cylindrical and said scrapers engage circumferentially around said bars.

3. The machine defined in claim 2 wherein said treatment compartment is formed at one end with an inlet, said machine further comprising deflecting plates carried on said frame between said bars and said inlet.

4. The machine defined in claim 2 wherein said means for displacing said carriage includes an electric motor on said carriage.

5. The machine defined in claim 4 wherein said means for displacing said carriage includes at least one horizontal rack on said housing above said treatment compartment and at least one pinion meshing with said rack, rotatable on said carriage, and driven by said motor.

6. The machine defined in claim 2 wherein said frame includes horizontally spaced end members each having a plurality of vertically and horizontally spaced holes receiving respective ends of the respective magnetic bars.

7. The machine defined in claim 6 wherein each of said members comprises a respective plurality of vertical elements each defining a respective vertical row of such holes.

8. The machine defined in claim 6 wherein said ends of said bars are each formed with a radially outwardly open groove, each of said end members being provided with a slidable element engageable in the respective grooves.

9. The machine defined in claim 8 wherein said slidable elements are vertically slidable in the respective members.

10. The machine defined in claim 9 wherein each of said members has two such slidable elements.

11. The machine defined in claim 2 wherein said housing has a scraper frame separate from said carriage frame and having respective scraper holders removably carrying said scrapers.

12. The machine defined in claim 11 wherein said scraper frame has vertical frame elements and horizontal frame elements bridging said vertical elements.

13. The machine defined in claim 11 wherein said scrapers are synthetic-resin cuffs circumferentially received in the respective holders and gripping the respective magnetic bars.

14. The machine defined in claim 11 wherein said scrapers include nozzles directed at the respective bars and means for feeding air under pressure to said nozzles.

15. The machine defined in claim 14 wherein said nozzles are annular, spacedly surround said magnetic bars, and are directed at an acute angle at the respective bars.

16. The machine defined in claim 14 wherein each of said vertical frame elements is generally tubular and open downwardly into said sump.

17. The machine defined in claim 15 wherein said vertical frame elements are formed internally with said nozzles and are formed with throughgoing passages through which the respective bars extend.

18. The machine defined in claim 15 wherein said vertical frame elements are generally hollow and have front and rear walls formed with aligned holes through which the respective bars pass, said nozzles being provided between said holes, and said walls being formed with annular inward extensions at said holes.

19. The machine defined in claim 18 wherein one of said walls can move horizontally relative to the respective nozzle.

20. The machine defined in claim 2 wherein said sump is a transverse gulley formed in the floor of said vessel and has an incline transverse to said treatment compartment.

21. The machine defined in claim 20, further comprising
 a drain conduit connected to the lowest portion of said sump;
 valve means in said conduit, and
 a pump in said conduit between said valve and said sump.

22. The machine defined in claim 21 wherein said valve means has one conduit branch opening into said outlet compartment and another branch opening externally of said vessel.

23. The machine defined in claim 22 wherein said one branch is provided with another valve preventing flow in said one branch.

24. The machine defined in claim 11, further comprising means including nozzles on said scraper frame for spraying a liquid on said scrapers as same are displaced along said magnetic bars.

25. A machine for filtering particles, in particular magnetically attractable particles, from a liquid, said machine comprising:
 a housing having a vessel;
 a weir in said vessel subdividing same into an elongated treatment compartment having a predetermined compartment length and an outlet compartment, said housing being formed in said treatment compartment with a sump;
 means for introducing a liquid to be cleaned into said treatment compartment and for withdrawing liquid from said outlet compartment;
 a carriage displaceable longitudinally on said vessel above said treatment compartment and suspending a vertical carriage frame in said treatment compartment;
 an array of horizontally extending spaced magnetic bars carried on said carriage frame in said treatment compartment, said bars each having a bar length measured parallel to said treatment compartment that is substantially less than said compartment length;
 respective scrapers fixed on said housing above said sump and engaging said bars;
 respective annular nozzles fixed on said scrapers surrounding and directed at the respective bars;
 means for feeding a fluid under pressure to said nozzles to direct annular fluid streams at the respective bars and thereby loosen particles from the bars adjacent the scrapers;
 means for displacing said carriage with said bars longitudinally relative to said housing and scrapers through a distance equal generally to said bar length and thereby scraping particles off said bars, whereby the particles freed from said bars drop in said treatment compartment; and
 means for withdrawing liquid from said sump.

26. A machine for filtering particles, in particular magnetically attractable particles, from a liquid, said machine comprising:
 a housing having a vessel;
 a weir in said vessel subdividing same into an elongated treatment compartment having a predetermined compartment length and an outlet compartment, said housing being formed in said treatment compartment with a sump;
 means for introducing a liquid to be cleaned into said treatment compartment and for withdrawing liquid from said outlet compartment;
 a carriage displaceable longitudinally on said vessel above said treatment compartment and suspending a vertical carriage frame in said treatment compartment, said frame including horizontally spaced end members each having a plurality of vertically and horizontally spaced holes;
 an array of horizontally extending spaced magnetic bars carried on said carriage frame in said treatment compartment, said bars each having a bar length measured parallel to said treatment compartment that is substantially less than said compartment length, said bars further having respective ends received in the respective holes of the end members, said ends of said bars being each formed with a radially outwardly open groove, each of said end members being provided with a slidable element engageable in the respective grooves;
 respective scrapers fixed on said housing above said sump and engaging said bars and including nozzles directed at the respective bars;
 means for feeding air under pressure to said nozzles.;
 means for displacing said carriage with said bars longitudinally relative to said housing and scrapers through a distance equal generally to said bar length and thereby scraping particles off said bars, whereby the particles scraped off said bars drop in said treatment compartment; and
 means for withdrawing liquid from said sump.

* * * * *